C. A. GILSON.
MECHANICAL CALCULATING DEVICE.
APPLICATION FILED APR. 14, 1921.

1,404,019.

Patented Jan. 17, 1922.

Inventor
C. A. Gilson.

By
Geo. P. Kimmel.

Attorney

UNITED STATES PATENT OFFICE.

CLAIR A. GILSON, OF NILES, MICHIGAN.

MECHANICAL CALCULATING DEVICE.

1,404,019. Specification of Letters Patent. Patented Jan. 17, 1922.

Application filed April 14, 1921. Serial No. 461,239.

*To all whom it may concern:*

Be it known that I, CLAIR A. GILSON, a citizen of the United States, residing at Niles, in the county of Berrien and State of Michigan, have invented certain new and useful Improvements in a Mechanical Calculating Device, of which the following is a specification.

This invention relates to mechanical calculating devices especially adapted for use by those whose business involves laborious arithmetical calculations.

The object of the invention is to provide a simple, small, compact device of this character by the manipulation of which certain arithmetical calculations may be expeditiously effected without figuring or computation by the user.

Another object is to provide a single logarithmic scale in combination with two indicators the movement of which is so controlled that various mathematical problems may be solved by the manipulation thereof.

Another object is to provide such a device employing two indicators, one of which may be moved either with or independently of the other, while the other moves only in unison with the independently movable indicator and when so moved causes the other indicator to move through the same angular distance and remains stationary when the independently movable indicator is individually operated.

With these and other objects in view, the invention consists in certain novel features of construction as hereinafter shown and described and then specifically pointed out in the claims.

In the accompanying drawing:—

Figure 1:
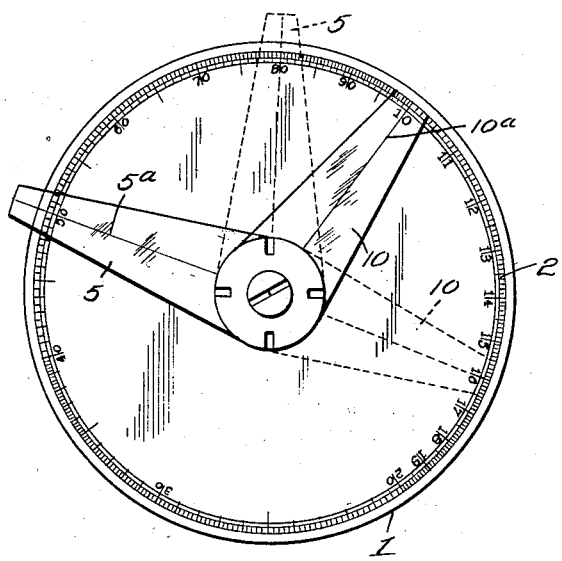
Figure 1 represents a plan view of the device embodying this invention.
Figure 2:
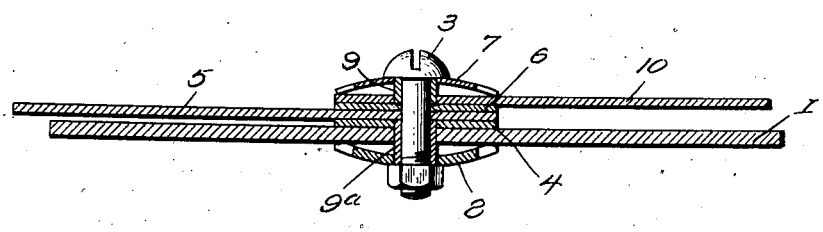
Fig. 2 is a transverse section thereof.

In the embodiment illustrated, a circular plate or dial 1 is shown constructed of any suitable material such as glazed paper, celluloid, metal or the like and having arranged on one face thereof adjacent its perimeter a logarithmic scale 2 in connection with which two indicators 5 and 10 are designed to co-operate for solving certain arithmetical problems in a manner presently to be described. The indicator 5 is made longer than the indicator 10, the latter terminating substantially flush with the perimeter of the scale 2, while the one designated 5 projects beyond the perimeter of the plate or dial 1, the projecting end being designed to form a finger piece to facilitate movements of the indicator.

The dial or plate 1 is centrally apertured for the passage therethrough of a bolt 3 equipped at opposite ends with the usual head and nut. The indicators or hands 5 and 10 are apertured at their inner ends for the passage of this bolt to connect them to the dial 1.

Arranged between the scale carrying face of the dial 1, and the inner face of the indicator 5 at its connected end is a washer 4 while a similar washer 6 is arranged on the bolt between the outer face of the indicator 5 and the inner face of the indicator 10.

Two convexo-concave spring washers 7 and 8 are also carried by the bolt 3, the washer 7 being made of thinner metal than the washer 8 and arranged between the head of the bolt and the outer face of the indicator 10, while washer 8 is arranged between the nut on the bolt and the outer face or rear face of the dial 1. These washers 7 and 8 are each provided respectively with collars or bushings 9 and 9ª which closely encircle the body of the bolt and between the opposed ends of which the inner end of the indicator 5 and the washer 6 are designed to be clamped, the indicator 10 being loosely mounted on the sleeve or collar 9 of washer 7.

From the above description it will be obvious that when the nut on bolt 3 is tightened the collars 9 and 9ª will be moved toward each other and the indicator 5 and washer 6 securely clamped between said collars causing them to operate as a unitary structure with bolt 3, it being thus obvious that the bolt, nut, collars 9 and 9ª, thin flat washer 6 and the longer indicator 5 being so clamped together will turn as a single unit, while the heavy spring washer 8 will remain stationary. The thin spring washer 7 and the short indicator 10 both turn together as a single unit on the sleeve 9 independently of the indicator 5 and both of them will turn with the indicator 5 when the latter is moved.

From the above description it will be obvious that the shorter indicator 10 may be turned freely relatively to the dial 1 and the other members of the device without in any way affecting them, but when the indicator 5 is turned, this indicator 10 will move with it through the same angular distance and it is upon this relative movement of the two indicators that the usefulness of the instrument depends.

In the ordinary calculating device of this type, two scales are employed with one indicator, but by using a single scale with two indicators, as above described, many advantages are gained adapting the device to be constructed at a small cost and in a very compact form. The movement of the two indicators is controlled by the two spring washers 7 and 8, the washer 8 being made of heavier metal and stronger than washer 7 holds the long indicator 5 stationary when the short indicator 10 is moved, but when the long indicator 5 is moved, the top washer 7 clamps the short indicator 10 so that both move in unison.

In the use of this device, the scale 2 is read the same as the scale of an ordinary slide rule to wit: the numeral 12 on the scale may be read as 12, or 120, or 1,200, or 1.2, or .0012 with any number of ciphers before or after the digits as determined by the problem that is being solved. The same is true of any other graduation. The operator must determine the position of the decimal point and number of ciphers in the result the same as when using an ordinary slide rule.

In the use of this calculator when it is desired to multiply say 50×16, the indicator 5 is placed with the axial line 5ᵃ thereof registering with the number 50 on the scale, while the indicator 10 is positioned with the axial line 10ᵃ thereof registering with the numeral 10 on the scale, as is shown in full lines in Fig. 1. The indicator 5 is then turned carrying with it the indicator 10 until the latter registers with the numeral 16 on the scale and the indicator 5 will then indicate the answer which in this instance would be 800, see the dotted line position of these indicators as shown in Fig. 1.

When it is desired to divide 180 say by 60, the indicator 5 is placed with its longitudinal axial line 5ᵃ registering with the numeral 18 on the scale and the line 10ᵃ of the indicator 10 registering with the numeral 60. The indicator 5 is then turned until indicator 10 registers with the numeral 10 on the scale and the indicator 5 will then indicate the numeral 3, the answer in this instance being 30.

To solve the proportion 47:89::127:X, the indicator 5 is set at the numeral 89 on the scale and the indicator 10 at 47. The indicator 5 is then turned until indicator 10 registers with the numeral 127 and the indicator 5 will then give the value of X as 240, which is the answer.

To solve 28:17.8×421= ?, the indicator 5 is set at 28 and the indicator 10 at 17.8 on the scale. Indicator 5 is then turned until indicator 10 registers with the numeral 421 when the indicator 5 will give the answer 664.

The indicators or hands 5 and 10 are preferably constructed of transparent material such as celluloid or the like so that the numbers on the scale 2 may be readily located and the line which extends longitudinally through the center of these members positioned directly over the proper numerals when a problem is to be solved.

While in the form shown only a single logarithmic scale is employed obviously additional scales may be added if desired, but the single scale renders the device easier to be understood and operated.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:—

1. A calculating device comprising a base plate having a circular logarithmic scale arranged thereon, a rotatable bolt passing through said plate centrally relative to said scale, a pair of indicators mounted on said bolt, one of said indicators being movable as a unit with said bolt and the other movable independently on the bolt, and means whereby said independently movable indicator is connected to move with the other on the turning of the latter.

2. A calculating device comprising a base plate having a circular logarithmic scale arranged thereon, a rotatable bolt passing through said plate centrally relative to said scale, a pair of indicators mounted on said bolt, means carried by said bolt whereby one of said indicators is connected to turn with the bolt and the other indicator to turn with said first mentioned indicator, said second mentioned indicator being rotatable independently of the other.

3. A calculating device comprising a base plate having a circular logarithmic scale arranged thereon, a rotatable bolt passing through said plate centrally relative to said scale, a pair of indicators mounted on said bolt, means carried by said bolt whereby one of said indicators is connected to turn with the bolt and to carry the other indicator with it, said carried indicator being independently movable relatively to the indicator which carries it.

4. A calculating device comprising a base plate having a circular logarithmic scale arranged thereon, a rotatable bolt passing through said plate centrally relative to said scale, a pair of indicators mounted on said bolt, spring washers of different strengths carried by said bolt for controlling the movement of said indicators whereby one of said indicators is connected to turn with the bolt and the other to turn with said first mentioned indicator, and also independently thereof.

5. A calculating device comprising a base plate having a circular logarithmic scale arranged thereon, a rotatable bolt passing through said plate centrally relative to said scale, a pair of spring washers carried by said bolt on opposite faces of said plate and having sleeves directed toward each other, a pair of indicators one mounted on one of said sleeves and the other on the bolt between the meeting ends of the sleeves, means for moving said washer carried sleeves into clamping engagement with said indicator whereby the indicator is connected to turn with the bolt, the indicator mounted on the sleeve being movable with the first mentioned indicator and also independently thereof.

6. A calculating device comprising a base plate having a circular logarithmic scale arranged thereon, a rotatable bolt passing through said plate centrally relative to said scale, a pair of spring washers mounted on said bolt one on one side of said plate and the other on the other side, said washers having inwardly extending integral sleeves encircling the bolt, an indicator mounted on the bolt between the meeting ends of said sleeves, another indicator mounted on one of said sleeves to turn freely thereon, flat washers mounted on said bolt between one of the indicators and the plate and between said indicators and means for clampingly connecting said parts whereby one of said indicators is connected to turn with the bolt and the other to turn with said first mentioned indicator or independently thereof.

7. A calculating device comprising a base plate having a circular logarithmic scale arranged thereon, a rotatable bolt passing through said plate centrally relative to said scale, a pair of indicators mounted on said bolt, one of said indicators being movable as a unit with said bolt and the other movable independently on the bolt, and means whereby said independently movable indicator is connected to move with the other on the turning of the latter said indicators being composed of transparent material and having longitudinally extending axially disposed lines to co-operate with the figures on the scale.

In testimony whereof, I affix my signature hereto.

CLAIR A. GILSON.